United States Patent
Di Sirio et al.

(10) Patent No.: US 9,430,188 B2
(45) Date of Patent: Aug. 30, 2016

(54) METHOD FOR PROTECTING A CRYPTOGRAPHIC DEVICE AGAINST SPA, DPA AND TIME ATTACKS

(75) Inventors: Giovanni Di Sirio, Salerno (IT); Giovanni Fontana, Naples (IT)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 1117 days.

(21) Appl. No.: 12/649,567

(22) Filed: Dec. 30, 2009

(65) Prior Publication Data

US 2010/0166177 A1 Jul. 1, 2010

(30) Foreign Application Priority Data

Dec. 31, 2008 (IT) .............................. MI2008A2364

(51) Int. Cl.
*H04L 29/06* (2006.01)
*G06F 7/00* (2006.01)
*H04L 9/00* (2006.01)

(52) U.S. Cl.
CPC ................. *G06F 7/00* (2013.01); *H04L 9/003* (2013.01); *G06F 2207/7266* (2013.01)

(58) Field of Classification Search
CPC .......... G05B 19/0423; G05B 19/0468; G08C 19/36; G08C 2201/30; G06F 3/00
See application file for complete search history.

(56) References Cited

U.S. PATENT DOCUMENTS

| | | | | |
|---|---|---|---|---|
| 8,046,304 B2 * | 10/2011 | Bleumer | .......................... | 705/62 |
| 8,219,820 B2 * | 7/2012 | Ebeid | ............................ | 713/180 |
| 2002/0184494 A1 * | 12/2002 | Awadalla | ...................... | 713/160 |
| 2008/0301459 A1 * | 12/2008 | Ebeid | ........................... | 713/180 |

FOREIGN PATENT DOCUMENTS

| | | | | |
|---|---|---|---|---|
| DE | 102007007699 | 8/2008 | .............. | H04L 9/28 |
| WO | 02/48845 | 6/2002 | .............. | G06F 1/00 |

\* cited by examiner

*Primary Examiner* — Joseph P Hirl
*Assistant Examiner* — Leynna Truvan
(74) *Attorney, Agent, or Firm* — Allen, Dyer, Doppelt, Milbrath & Gilchrist, P.A.

(57) ABSTRACT

A method is for operating a cryptographic device to reduce effects of power analysis and time attacks. The method may include executing a first set of cryptographic algorithm computations with a first crypto-processor of the cryptographic device. The first set of cryptographic algorithm computations may provide encryption of a first set of data to be protected with a first secret key stored in the cryptographic device. The method may further include executing a second set of cryptographic algorithm computations with a second crypto-processor of the cryptographic device for providing encryption of a second set of data different from the first set of data to be protected with a second different secret key.

30 Claims, 4 Drawing Sheets

METHOD FOR PROTECTING A CRYPTOGRAPHIC DEVICE AGAINST SPA, DPA AND TIME ATTACKS

FIELD OF THE INVENTION

The present invention relates to a method for protecting a cryptographic device against simple power analysis (SPA)-differential power analysis (DPA) attacks and/or time attacks and to a cryptographic device comprising a protection module for protecting against SPA-DPA and/or time attacks.

BACKGROUND OF THE INVENTION

As is well known, although there has been an extensive research suggesting that Data Encryption Standard (DES), triple DES, Advanced Encryption Standard (AES), Secure Hash Algorithm (SHA), Rivest Shamir Adleman algorithm (RSA), and other cryptographic algorithms are mathematically strong, these algorithms are not secure against attacks intended to observe their internal computations.

The computations performed for the execution of a cryptographic algorithm can be considered under two different points of view: as abstract mathematical operations parameterized by a secret key for mapping input data onto output data, or as the actual implementation of the mathematical algorithm into a program running on a given processor, in a given environment, and therefore showing specific characteristics dependant on the processor and on the environment wherein the cryptographic algorithm is implemented. The first point of view is known as the classical crypto analysis, and the second one is known as the side-channel crypto analysis.

The side-channel crypto analysis takes advantage of implementation-specific characteristics to recover the secret parameters involved in the computations, i.e. the key of the cryptographic algorithm. Although side-channel crypto analysis is less general than the classical crypto analysis, since the former is related to a given implementation environment, it is often more powerful than the classical crypto analysis, and therefore very seriously considered in the implementation of cryptographic devices.

The power consumption of a cryptographic token, such as a smart card, can provide information, both on the operations performed in the execution of the cryptographic algorithm, and about the secret parameters of the algorithm. As time passes, the energy used by the smart card, which is provided via the terminal pin, can therefore easily be measured for extracting information about the algorithm and its secret parameters.

There are several kinds of attacks to a smart card, or to other cryptographic devices, in order to extract secret information, and as a consequence the security level of the device is compromised. Two classes of attacks have been demonstrated as particularly simple and effective: Differential Power Analysis (DPA) and Simple Power Analysis (SPA). Unlike physical attacks, both SPA and DPA attacks are non-invasive, easily-automated, and can be mounted without knowing the design of the target device.

DPA is a class of attacks allowing the cryptographic analysts to extract the secret keys by analyzing the power consumption of smart cards, or other cryptographic devices, and performing a statistical analysis on the measured data. SPA is a simpler form of attack that does not use any statistical analysis.

There are hardware/software combined countermeasures to defend from such attacks, including techniques for reducing the leakage of information from cryptographic devices, techniques for adding noise to the power consumption measurements (e.g. randomization techniques during the execution of the operations), and techniques for keeping the cryptographic algorithms secure even if running on hardware that does leak information.

As for the software countermeasures, the target is not reducing the signal amplitude on the side channel, but rather making the conveyed information useless by obscuring the internal parameters.

SUMMARY OF THE INVENTION

The technical problem underlying the present disclosure is that of providing a method against the leakage of secret information of smart cards and other cryptographic devices having structural and functional characteristics which enhance the security level of such devices against attacks based on the analysis of the power consumption of the cryptographic device, i.e. against SPA-DPA and/or time attacks, in this way overcoming the limits which still affect the devices realized according to the prior art.

The approach underlying the present invention is that of providing a method for executing false cryptographic computations in a cryptographic device during the execution of cryptographic algorithm computations which encrypt data to be protected in the cryptographic device, in order to randomly modify the device power consumption and consequently make the DPA or SPA and/or the time analysis, performed by possible attackers, far more difficult to be carried out successfully.

On the basis of such approach, a method for protecting a cryptographic device against SPA-DPA and/or time attacks may comprise executions of cryptographic algorithm computations with a crypto-processor of the cryptographic device. The computations may provide encryption of data to be protected with a secret key stored in the cryptographic device. The computations may comprise executions of further cryptographic algorithm computations with a second crypto-processor of the cryptographic device, which may provide encryption of data different from the data to be protected, with a second different secret key.

In other words, the method may be executed on at least two crypto-processors. One processor may be randomly selected to execute the algorithm computations with a genuine key, while the other one may execute the computations with a suitably chosen false key, in order to modify the power consumption and make the related analysis of secret information far more difficult to be carried out successfully.

For example, the method may be executed on more than two crypto-processors to execute the algorithm computations both with suitably chosen false keys and, for one crypto-processor only which is randomly selected, with the genuine key, in order to further increase the difficulty level of secret information extraction through power consumption analysis as previously indicated.

Another aspect is directed to a cryptographic device that may comprise protecting means or a protection module for protecting against SPA-DPA and/or time attacks. The protection module may include a secret key and a crypto-processor for executing cryptographic algorithm computations encrypting data to be protected with the secret key. More particularly, the protection module may comprise a second different secure key and a second crypto-processor for executing further cryptographic algorithm computations providing encryption of data different from the data to be protected, with the second different secret key. The characteristics and advantages of the method for randomizing the power consumption may increase the difficulty level of SPA and DPA and/or time analysis applied to cryptographic devices.

DETAILED DESCRIPTION OF THE PREFERRED EMBODIMENTS

Figure 1:
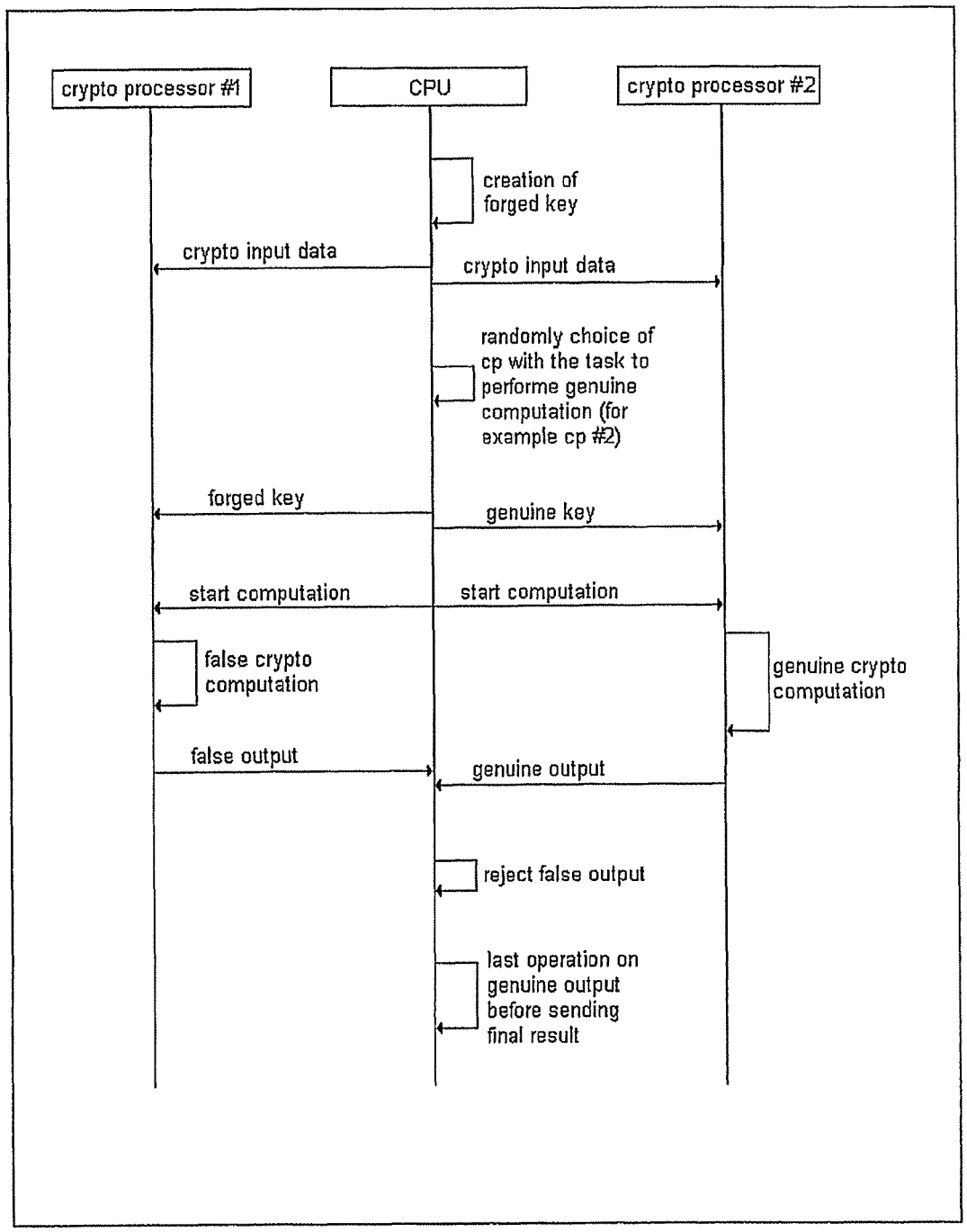
FIG. 1 schematically represents the steps involved in the implementation of the method for protecting a cryptographic device, according to the present invention.
Figure 2:
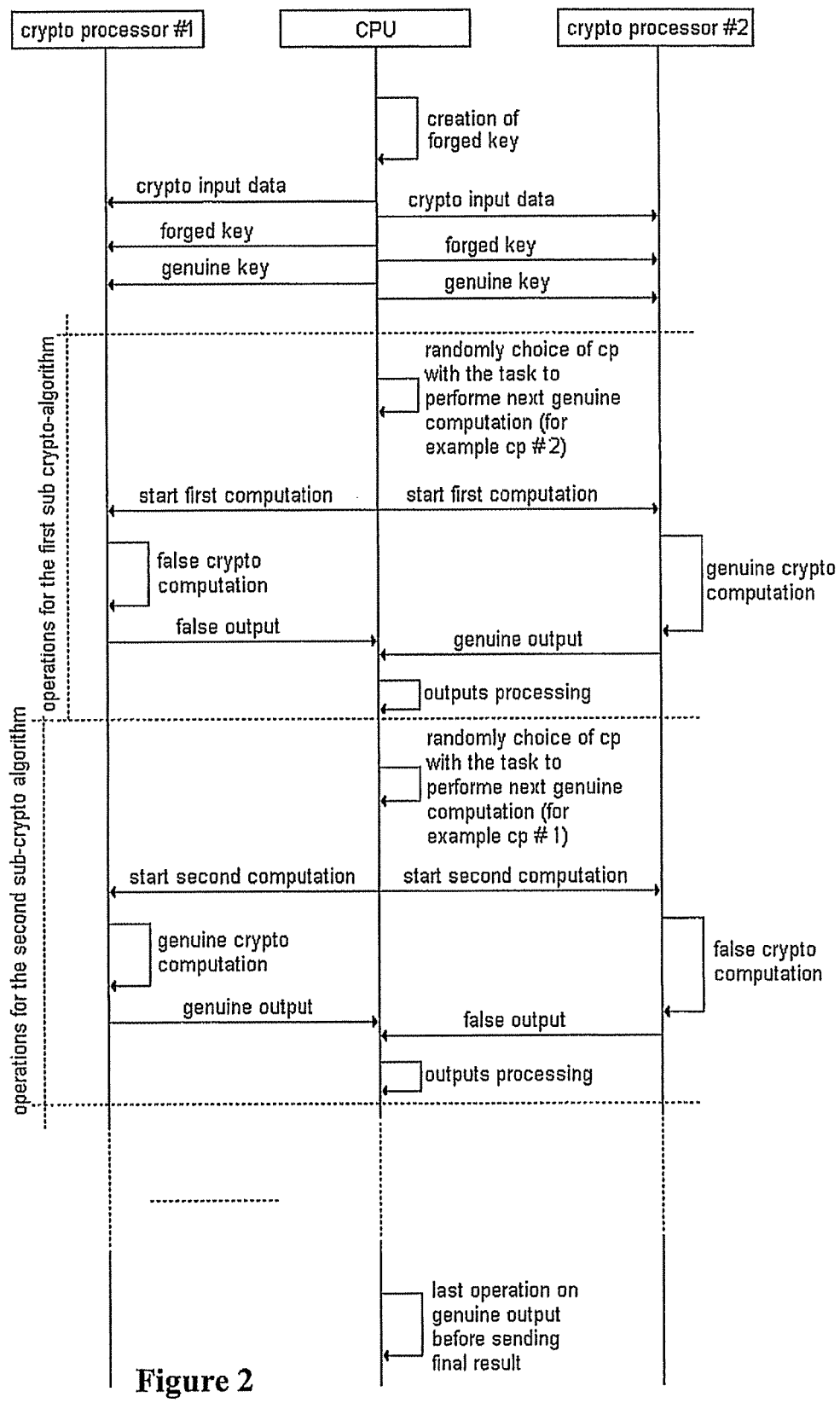
FIG. 2 schematically represents the steps of the method for protecting the cryptographic device wherein a cryptographic algorithm is split in several sub-algorithms, according to the present invention.

With reference to FIGS. 1-2, a cryptographic device includes first and second crypto-processors, also referred to as twin crypto-processors. The idea is to duplicate the computations that have to be performed in the cryptographic algorithm in the following way: the algorithm computations are simultaneously (in parallel) executed twice by the twin crypto-processor, one algorithm is executed with a forged (false) key and the other one with the genuine key or secure key.

Each of the two crypto-processors may correspondingly generate power consumption different from one another, and the total power consumption turns out to be produced by the contributions of both crypto-processors. The consequent modification of the power consumption, compared to the power consumption that would have been produced in case of execution of the single group of computations with the genuine key, makes it harder for an attacker to successfully extract secret information through SPA or DPA analysis. This idea can be easily generalized with any number of crypto-processors, each of them executing in parallel the same cryptographic algorithm, but only one using the genuine key and all the remaining ones using different forged keys.

Hereinbelow is a description of the main components concerned with this disclosure: cp, crypto processor; forged key, the key used to hide the genuine key during its utilization; genuine key, the key that may remain secret; ncp, number of crypto processors; nfk, number of forged keys; and smart card or integrated circuit (IC) Card, it is the token chosen to present the basic idea of this disclosure.

The method according to this disclosure includes the following steps: generation of forged keys: the CPU of a cryptographic device or each crypto-processor therein included generates a forged (false) key. The false key can be generated either randomly or in any other way suitable for minimizing the efficiency of an attack via SPA or DPA. In the latter case, the forged key depends on the cryptographic algorithm used and/or on the genuine key. In case the number ncp of crypto-processors is greater than two, the number nfk of forged keys is equal to ncp 1.

Random distribution of the cryptographic computations among the crypto-processors included in the cryptographic device: the CPU of the cryptographic device randomly shares out the input data, i.e. the data that is to be ciphered along with the genuine key and the forged keys, among all crypto-processors. Then the CPU randomly or pseudo-randomly chooses the crypto-processor in charge of performing the cryptographic algorithm computations using the genuine key, while all the remaining ones may perform computations using a forged key. The graphical representation of the method according to the present disclosure is schematically represented in FIG. 1.

The method can be further improved by splitting the original algorithm in many sub-algorithms (key sensitive for SPA and DPA) and iterating for each of the sub-algorithms the distribution of the input data and the corresponding computations. In this latter case, the CPU randomly or pseudo-randomly chooses, at each iteration, the crypto-processor in charge of performing the sub-algorithm computations using the genuine key. The CPU has to keep track of the crypto-processor performing the genuine computation at each iteration, for example, by storing the identification number of the crypto-processor in a variable, for example, an internal register. A graphical representation of the step of splitting the original algorithm in several sub-algorithms is shown in FIG. 2.

The cryptographic algorithm computations are simultaneous, i.e. all the computations performed by the different crypto-processors may start at the same time, apart from a negligible time interval. Similarly, if the cryptographic algorithm has been split in many sub-algorithms, each sub-algorithm may start at the same time apart from a negligible time interval for every crypto-processor.

Output data: the final outcome of the cryptographic algorithm may be worked out by the CPU considering only the output data resulting from the computations of the crypto-processor, which has used the genuine key. The above description of the method protecting the cryptographic algorithm mostly refers to the case of a twin crypto-processor for convenience of explanation only, although they can be easily modified for the more general case of a multiple crypto-processor.

Figure 3A:
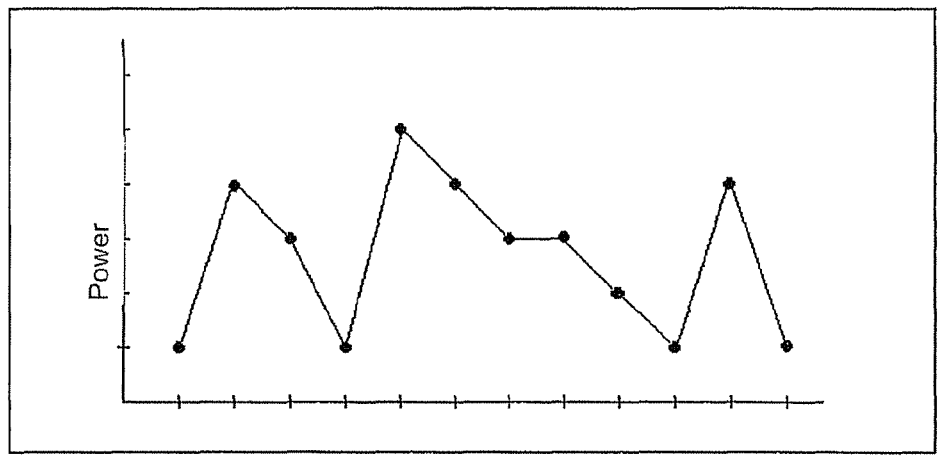
FIGS. 3A and 3B are two diagrams representing SPA monitoring for a given cryptographic algorithm processed respectively with a first key k1 and a second key k2, according to a method for protecting a cryptographic device of the prior art.
Figure 3B:
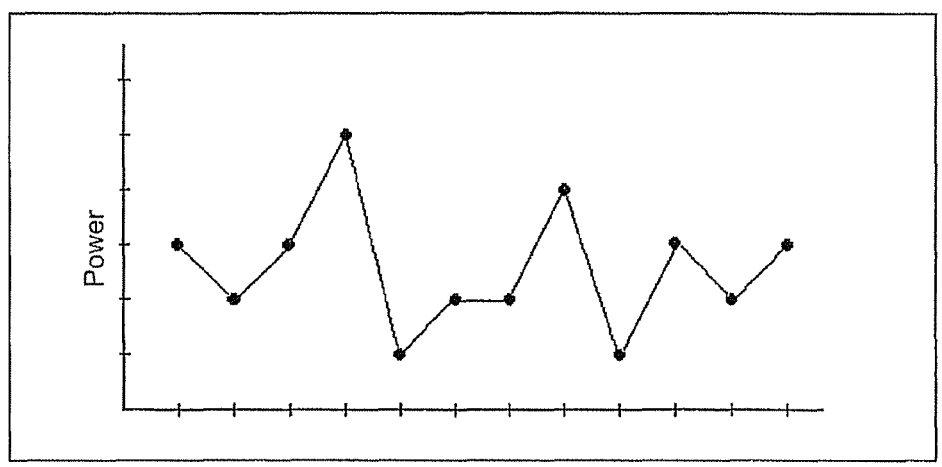
Figure 4:
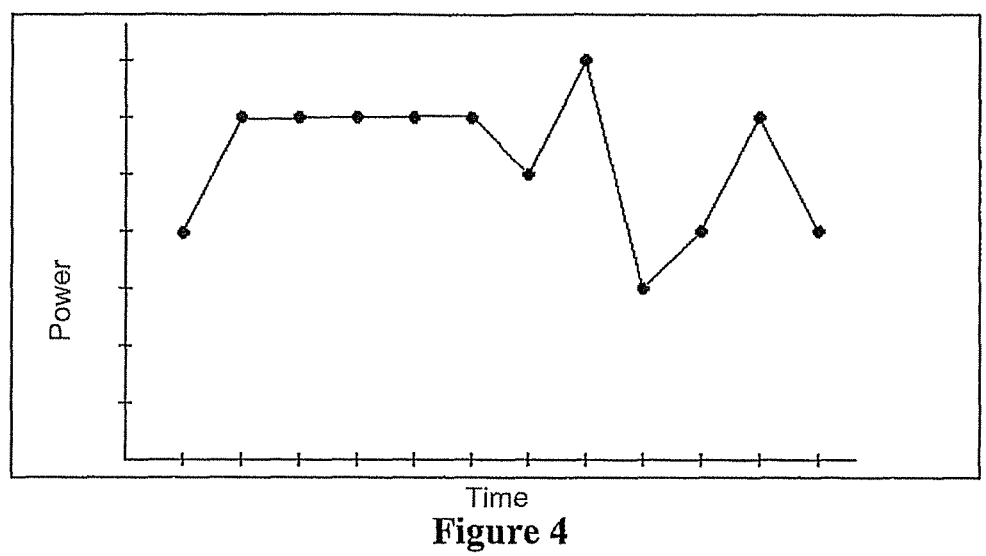
FIG. 4 is a diagram representing SPA monitoring for a given cryptographic algorithm processed by a crypto-processor and a second crypto-processor, according to the present invention.

The advantages provided by the method according to the present disclosure can be evaluated by comparing FIG. 4 to FIGS. 3A-3B. The diagram of FIG. 3A shows a SPA monitoring of a cryptographic algorithm processed by a crypto-processor, which uses a secret key k1, while FIG. 3B shows the SPA monitoring of the same cryptographic algorithm processed by the crypto-processor using a different secret key k2.

The graphic reported in FIG. 4 shows the SPA monitoring resulting from the processing of the same previous cryptographic algorithm twice in the same time, that is by way of a twin crypto-processor using the same previous secret keys k1 and k2 for the two parallel computations. The diagram of FIG. 4 is the superposition of the diagrams shown in FIG. 3A and FIG. 3B.

Assuming, for example, that k1 is the genuine key used for a power consumption randomization, while k2 is the forged key, the resulting randomized power consumption produced by the twin crypto-processor, and reported in FIG. 4, shows that the corresponding SPA monitoring diagram is completely different from the graphic reported in FIG. 3A, which has been assumed to be the one corresponding to the genuine key. That proves the basic idea of this disclosure, i.e. the proposed method can be effectively exploited to enhance the difficulty level of extracting secret information from the power consumption by way of SPA and DPA analysis.

The main steps of the method for protecting a cryptographic device according to the present disclosure are hereinbelow reported. A crypto-processor included in the cryptographic device executes cryptographic algorithm computations, providing encryption of data to be protected. More particularly, such data are encrypted with a secret key, which is stored in the cryptographic device.

A second crypto-processor included in the cryptographic device executes further cryptographic algorithm computations, providing encryption of data different from the data to be protected. More particularly, this different data is encrypted with a second secret key, different from the secret key. Advantageously, the execution of the further cryptographic algorithm computations introduces power consumption that is generated by the second crypto-processor and is not associated to the computations executed on data to be protected. The cryptographic algorithm computations and the further cryptographic algorithm computations are based on different keys, i.e. the secret key stored on the cryptographic device and the second secret key, which may be generated randomly.

The second different key is preferably generated with software running on a CPU of the cryptographic device. This software switches the executions of the cryptographic algorithm computations and the executions of the further cryptographic algorithm computations between the crypto-processor and the second crypto-processor. Accordingly, the crypto-processor or the second crypto-processor is selectively activated for the encryption of data to be protected while the non-selected processor randomly introduces latencies, which mislead potential attacks.

More particularly, the software switches randomly the executions of the cryptographic algorithm computations and the executions of the further cryptographic algorithm computations. Furthermore, it is also provided that the software randomly generates the second different secret key.

According to another embodiment, the executions of the further cryptographic algorithm computations are executed by a plurality of further crypto-processors included in the cryptographic device, which are different from the crypto-processor and the second crypto-processor. In this case, the software generates a further key for each of the further crypto-processors.

The software of the CPU tracks an identification number of each crypto-processor included in the cryptographic device in order to identify the processor executing the algorithm with the secure key, i.e. the processor which is involved in the encryption of data to be protected, for recovering the input data which has been correctly processed and for working out the final output data. Preferably, the identification number is stored in a variable or an internal register of cryptographic device.

According to another embodiment, the second crypto-processor independently generates the second different key and the software of the CPU randomly selects the crypto-processor or the second crypto-processor for executing the computations with the secure key, while the non-selected crypto-processors executes the further computations. The cryptographic algorithm computations intended to encrypt data to be protected may be split into several sub-algorithms which may be processed by the crypto-processor and second crypto-processor, properly selected with the software of the CPU.

The present disclosure further relates to a cryptographic device implementing the method described above. More particularly, the cryptographic device comprises a protection module storing a secret key and including a crypto-processor for executing cryptographic algorithm computations encrypting data to be protected with the secret key.

The protection module stores a second different secure key and comprises a second crypto-processor for executing further cryptographic algorithm computations, which provide encryption of data different from the data to be protected with the second different secret key. Advantageously, the further cryptographic algorithm computations executed by the second crypto-processor on data different from data to be protected introduce, latencies which mislead potential attacks.

According to another embodiment, the protection module is included inside an IC card. The IC card comprises a CPU for switching the executions of the cryptographic algorithm computations and the further cryptographic algorithm computations between the crypto-processor and the second crypto-processor. Preferably, the software randomly switches the executions of the cryptographic algorithm computations and the executions of the further cryptographic algorithm computations.

That which is claimed:

1. A method of operating a cryptographic device to reduce effects of power analysis attacks, the method comprising:
   splitting cryptographic computations in the cryptographic device into a first set of cryptographic algorithm computations and a second set of cryptographic algorithm computations and pseudo-randomly assigning the first and second sets of cryptographic algorithm computations to a first crypto-processor and at least one second crypto-processor;
   executing the first set of cryptographic algorithm computations with the first crypto-processor of the cryptographic device, the first set of cryptographic algorithm computations providing encryption of a first set of data to be protected with a first secret key;
   executing the second set of cryptographic algorithm computations with the at least one second crypto-processor of the cryptographic device for providing encryption of a second set of data different from the first set of data to be protected with a second different secret key; and
   generating varying power consumption from the first crypto-processor and the at least one second crypto-processor respectively based upon the execution of the first and second sets of cryptographic algorithm computations, thereby reducing the effects of power analysis attacks.

2. The method according to claim 1 wherein the first secret key is stored in the cryptographic device.

3. The method according to claim 1 wherein the second different secret key is generated in the cryptographic device.

4. The method according to claim 1 wherein the execution of the first set of cryptographic algorithm computations and the second set of cryptographic algorithm computations switches between the first crypto-processor and the at least one second crypto-processor.

5. The method according to claim 4 wherein the switching is random.

6. The method according to claim 1 wherein the second different secret key is randomly generated.

7. The method according to claim 1 wherein the at least one second crypto-processor comprises a plurality thereof.

8. The method according to claim 1 wherein the execution of the first and second sets of cryptographic algorithm computations are simultaneous with each other.

9. The method according to claim 1 wherein the at least one second crypto-processor independently generates the second different secret key.

10. A method of operating a cryptographic device to reduce effects of power analysis attacks, the method comprising:
splitting cryptographic computations in the cryptographic device into a first set of cryptographic algorithm computations and a second set of cryptographic algorithm computations and pseudo-randomly assigning the first and second sets of cryptographic algorithm computations to a first crypto-processor and at least one second crypto-processor;
executing the first set of cryptographic algorithm computations with the first crypto-processor of the cryptographic device, the first set of cryptographic algorithm computations providing encryption of a first set of data to be protected with a first secret key stored in the cryptographic device;
independently generating a second different secret key in the cryptographic device;
executing the second set of cryptographic algorithm computations with the at least one second crypto-processor of the cryptographic device for providing encryption of a second set of data different from the first set of data to be protected with the second different secret key, the execution of the first and second sets of cryptographic algorithm computations being simultaneous with each other; and
generating varying power consumption from the first crypto-processor and the at least one second crypto-processor respectively based upon the execution of the first and second sets of cryptographic algorithm computations, thereby reducing the effects of power analysis attacks.

11. The method according to claim 10 wherein the execution of the first set of cryptographic algorithm computations and the second set of cryptographic algorithm computations switches between the first crypto-processor and the at least one second crypto-processor.

12. The method according to claim 11 wherein the switching is random.

13. The method according to claim 10 wherein the second different secret key is randomly generated.

14. The method according to claim 10 wherein the at least one second crypto-processor comprises a plurality thereof.

15. An integrated circuit (IC) card to be inserted into a cryptographic device, the IC Card comprising:
a terminal pin;
a first crypto-processor and at least one second crypto-processor associated with said terminal pin; and
a central processing unit (CPU) associated with said terminal pin and configured to split cryptographic computations into a first set of cryptographic algorithm computations and a second set of cryptographic algorithm computations, and pseudo-randomly assign the first and second sets of cryptographic algorithm computations to said first crypto-processor and said at least one second crypto-processor;
said first crypto-processor configured to execute the first set of cryptographic algorithm computations for providing encryption of a first set of data to be protected with a first secret key; and
said at least one second crypto-processor configured to execute the second set of cryptographic algorithm computations for providing encryption of a second set of data different from the first set of data to be protected with a second different secret key;
said first crypto-processor and said at least one second crypto-processor configured to generate varying power consumption respectively based upon the execution of the first and second sets of cryptographic algorithm computations, thereby reducing effects of power analysis attacks.

16. The IC card according to claim 15 wherein the first secret key is stored in the cryptographic device.

17. The IC card according to claim 15 wherein said CPU is configured to switch execution of the first set of cryptographic algorithm computations and the second set of cryptographic algorithm computations between said first crypto-processor and said at least one second crypto-processor.

18. The IC card according to claim 17 wherein said CPU is configured to randomly switch the execution of the first set of cryptographic algorithm computations and the second set of cryptographic algorithm computations.

19. The IC card according to claim 17 wherein said CPU is configured to randomly generate the second different secret key.

20. The IC card according to claim 15 wherein said at least one second crypto-processor comprises a plurality thereof, each configured to execute the second set of cryptographic algorithm computations.

21. The IC card according to claim 15 wherein said first crypto-processor and said at least one second crypto-processor execute the first and second sets of cryptographic algorithm computations simultaneous with each other.

22. The IC card according to claim 15 wherein said at least one second crypto-processor is configured to independently generate the second different secret key.

23. A circuit on an integrated circuit (IC) card to be inserted into a cryptographic device, the circuit comprising:
a first crypto-processor and at least one second crypto-processor; and
a central processing unit (CPU) configured to
split cryptographic computations into a first set of cryptographic algorithm computations and a second set of cryptographic algorithm computations, and
pseudo-randomly assign the first and second sets of cryptographic algorithm computations to said first crypto-processor and said at least one second crypto-processor;
said first crypto-processor configured to execute the first set of cryptographic algorithm computations for providing encryption of a first set of data to be protected with a first secret key; and
said at least one second crypto-processor configured to execute the second set of cryptographic algorithm computations for providing encryption of a second set of data different from the first set of data to be protected with a second different secret key;
said first crypto-processor and said at least one second crypto-processor configured to generate varying power consumption respectively based upon the execution of the first and second sets of cryptographic algorithm computations, thereby reducing effects of power analysis attacks.

24. The circuit according to claim 23 wherein the first secret key is stored in the cryptographic device.

25. The circuit according to claim 23 wherein said CPU is configured to switch execution of the first set of cryptographic algorithm computations and the second set of cryptographic algorithm computations between said first crypto-processor and said at least one second crypto-processor.

26. The circuit according to claim 25 wherein said CPU is configured to randomly switch the execution of the first set of cryptographic algorithm computations and the second set of cryptographic algorithm computations.

27. The circuit according to claim 25 wherein said CPU is configured to randomly generate the second different secret key.

28. The circuit according to claim 23 wherein said at least one second crypto-processor comprises a plurality thereof, each configured to execute the second set of cryptographic algorithm computations.

29. The circuit according to claim 23 wherein said first crypto-processor and said at least one second crypto-processor execute the first and second sets of cryptographic algorithm computations simultaneous with each other.

30. The circuit according to claim 23 wherein said at least one second crypto-processor is configured to independently generate the second different secret key.

* * * * *